United States Patent [19]
Bora

[11] Patent Number: 5,375,314
[45] Date of Patent: Dec. 27, 1994

[54] METHOD FOR REPAIRING A DAMAGED SILL MEMBER OF A VEHICLE BODYWORK

[75] Inventor: Viorel Bora, Untereisesheim, Germany

[73] Assignee: Audi AG, Ingolstadt, Germany

[21] Appl. No.: 173,624

[22] Filed: Dec. 23, 1993

[30] Foreign Application Priority Data

Jun. 25, 1991 [DE] Germany .................. 4120844

[51] Int. Cl.$^5$ .......................... B23P 6/00; B21D 1/12
[52] U.S. Cl. .................. 29/402.13; 29/402.07; 29/402.08; 29/402.16; 29/897.2
[58] Field of Search .......... 29/401.1, 402.07, 402.08, 29/402.09, 402.11, 402.13, 402.16, 897.2; 280/781, 797, 800; 296/146.5, 146.6, 185–188, 195–197, 193, 203, 204, 205

[56] References Cited

U.S. PATENT DOCUMENTS

| | | | |
|---|---|---|---|
| 4,369,559 | 1/1983 | Phillips | 29/401.1 |
| 4,457,555 | 7/1984 | Draper | 296/203 X |
| 4,847,972 | 7/1989 | Anderson et al. | 296/204 X |

FOREIGN PATENT DOCUMENTS

| | | |
|---|---|---|
| 0146716 | 12/1988 | European Pat. Off. . |
| 2093444 | 1/1972 | France . |
| 3811427 | 10/1989 | Germany . |
| 59-063411 | 4/1984 | Japan . |
| 2-074475 | 3/1990 | Japan . |
| 0365305 | 9/1931 | United Kingdom . |

*Primary Examiner*—Peter Dungba Vo
*Attorney, Agent, or Firm*—Jacques M. Dulin

[57] ABSTRACT

A method for repairing a damaged sill member of a vehicle bodywork, wherein the sill member is formed as an extruded hollow section member which is disposed connected between two cast light-metal node elements. A damaged girder portion of an extruded hollow section sill member is severed at a distance from each node element, and is removed. A girder stub portion of the original hollow section sill member remains attached to each node element. Short sleeve inserts are slidably inserted into the open ends of each of the girder stub portions such that a portion of a sleeve insert extends into an associated stub portion and another portion of the sleeve insert projects out of the associated stub portion. A replacement girder portion is inserted between the open ends of the girder stub portions. The sleeve inserts form internal sleeve supports at the ends of the replacement girder portion and span a gap which is formed between the open ends of the replacement girder portion and each of the open ends of the adjacent girder stub portions. A weld seam joins together the respective girder stub portion, the sleeve insert lying beneath the gap, and the open end of the replacement girder portion.

13 Claims, 2 Drawing Sheets

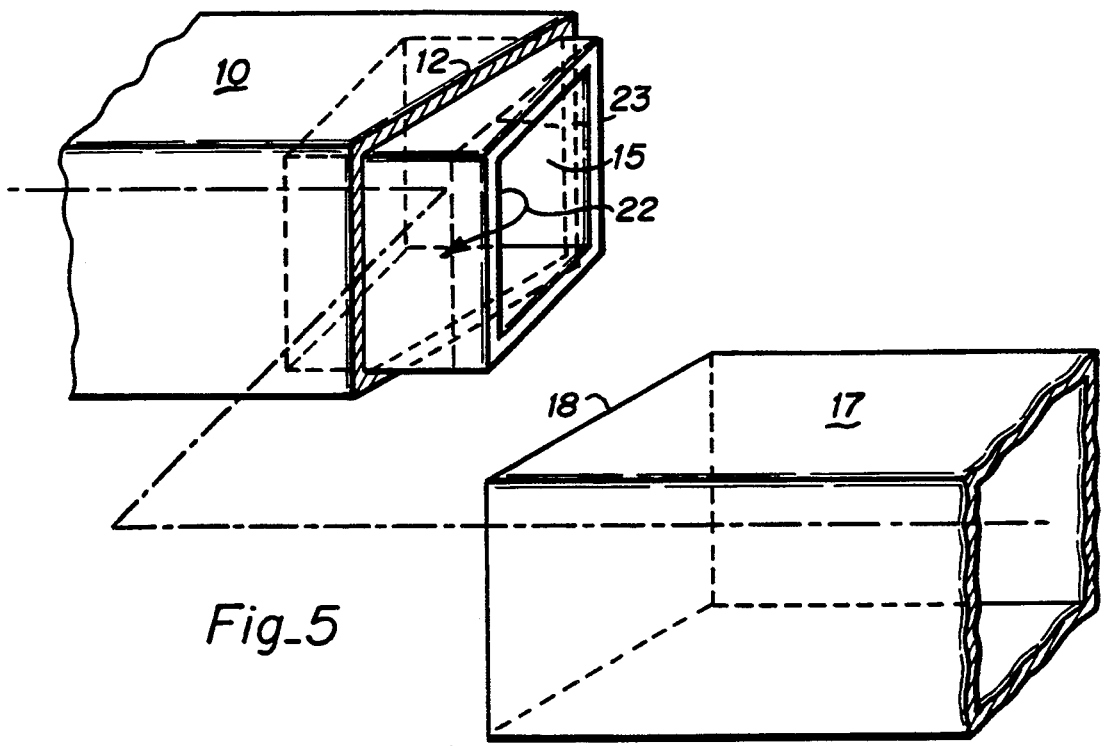
Fig_5
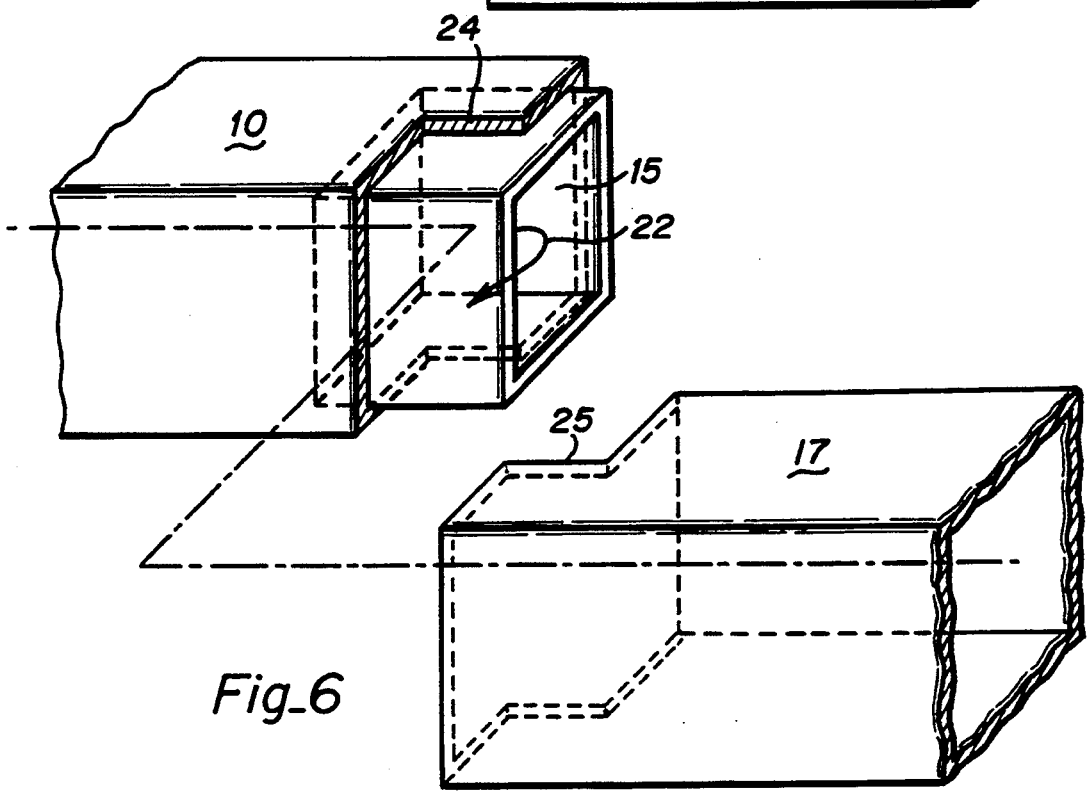
Fig_6

5,375,314

METHOD FOR REPAIRING A DAMAGED SILL MEMBER OF A VEHICLE BODYWORK

FIELD

The invention relates to motor vehicle body repair. More particularly, the invention relates to a method and apparatus for the repair of a damaged extruded light-metal, hollow section sill member of a light-metal vehicle bodywork wherein the sill member is disposed connected between two cast light-metal node elements.

BACKGROUND

In most present day motor vehicles, steel sheets, shaped by a conventional deep-drawing process, are used to construct the self-supporting body structure for the motor vehicles. Girders having hollow sections are fabricated by welding together two or more deep-drawn sheets. The press tools for bending and shaping the steel sheets are relatively expensive, but they permit the production of large numbers of pressings. Thus, for large-scale production runs of vehicle bodies, steel sheets are cost-effective. However, for short production runs, the production of bodies in this way is very expensive because of the heavy investment in tooling.

From published European Patent document EP 0 146 716 BI, it is known, particularly for short production runs, to produce vehicle bodies for passenger motor vehicles having a supporting structure of hollow section frame members joined together by node elements. The hollow section frame members are formed as light-metal (e.g. aluminum alloy) extruded sections, and the node elements are formed as light-metal castings. Such supporting structures provide a more cost-effective alternative for short production runs. In addition, a construction method of this kind provides a vehicle body of lower weight and also provides improved protection against corrosion.

During a collision, the supporting structure of the vehicle body may become damaged and deformed. Generally, it is desirable to restore the vehicle body to its original condition. In the case of vehicle bodies comprised of sheet metal support structures, this restoration is relatively simple. The deformed sheet metal parts can be repaired by restraightening the deformed part on a straightening bench.

However, in the case of a vehicle body consisting of light-metal node elements and light-metal extruded sections, simply restraightening or replacing the deformed girder parts is not possible for a number of reasons. First, a deformed light-metal girder may be reshaped but only by a small amount since restraightening a bent light-metal girder by a large amount varies the structure of the girder and can result in a significant reduction in its strength. Reshaping a deformed light-metal girder on a straightening bench in the known manner for a sheet metal body is therefore impractical, ineffective, and unreliable.

It is also possible to perform a repair of a damaged girder member by cutting out and removing the entire deformed girder member and rewelding a replacement girder member in its place. Such a procedure is commonly done for the replacement of a deformed sheet metal part in a sheet metal body.

However, in view of the high temperatures produced during the welding process, such a repair procedure is not suitable for a light-metal bodywork since high temperature thermal welding adversely affects the strength of the material in the vicinity of the weld joint. This is especially critical where the heat affected zones experience repeated weldings. During the repair of a bottom sill member in light-metal bodywork, for example, a replacement sill member would be inserted between two cast light-metal node elements and fixed in place by weld seams. These weld seams would be in the immediate vicinity of the previous weld regions of the node. Thus, replacement of an entire damaged light-metal girder member at the node elements in accordance with the prior art technique would be ineffective and unreliable.

In accordance with another known repair procedure, only a portion of a girder adjacent to the region of deformation is removed and a replacement girder section is inserted in its place. The new girder section is then affixed to the remaining girder sections by "butt" welded joints. However, welding such joints, in this context, is difficult and unreliable. In addition, it is often necessary to grind down the new butt weld seams in order to restore the external surface of the newly attached girder with a smooth outer contour. Such grinding operations may adversely affect the strength and reliability of the finished joint. This procedure therefore is unacceptable in the case of frame members fabricated as light-metal extrusions. Also, for the same reasons as above described, it is very difficult and unreliable to use other types of weld joints, such as, for example, overlapping regions of the replacement girder and the original unremoved girder portions.

Therefore, there remains a need in the art for a repair technique for replacing damaged light-metal girder members of a vehicle body, whereby the deformed girder members can be repaired without compromising the original strength of the vehicle bodywork and without undue finish work.

THE INVENTION

Summary

It is therefore a primary object of the invention to provide a novel method and apparatus for repairing a damaged girder member of a light-metal vehicle bodywork consisting of hollow section light-metal extruded girder members connected together by cast light-metal node elements.

It is another object of the invention to provide a novel method and apparatus for repairing a damaged girder member of a light-metal vehicle bodywork of the type described whereby the repair procedure is simple, inexpensive and can be performed without difficulty using readily available replacement parts and conventional workshop tools.

It is another object of the invention to provide a novel method and apparatus for repairing a damaged girder member of a light-metal vehicle bodywork of the type described whereby only the damaged portion of the girder member is cut out and is replaced by a replacement girder portion welded in its place and whereby the weld seams do not require additional finish work.

The invention comprises a method and an apparatus for repairing a damaged girder member of a motor vehicle having a light-metal coachwork, wherein the girder member is formed as an extruded hollow section member and is disposed connected between two cast light-metal node elements. In a preferred embodiment of the present invention, a damaged or deformed portion of the girder portion is severed at a distance from each node element thereby leaving a girder stub portion of the original hollow section girder member attached to each node element.

In the preferred embodiment, the damaged portion of the girder member is severed from the girder stub portions at an angle such that the exposed cut ends of the girder stub portions are conically open towards the vehicle's sides. That is, the free space region defined as the distance between the two cuts expands in a generally conical manner away from the vehicle body.

Short length sleeve inserts, are then fitted within the outwardly open cut ends of each girder stub portion. The sleeve inserts have an outer diameter sized slightly smaller than the inner diameter of each of the girder stub portions to province a friction fit therewithin. Once fitted in place, a portion of each sleeve insert piece extends part way into its associated stub portion leaving a remaining portion exposed which projects into the free space region.

A replacement girder portion having opposed cut ends which match the outwardly open cut ends of each stub portion is then fitted in place over the exposed portions of the sleeve inserts. The replacement girder portion preferably has a length slightly shorter than the distance between the open cut ends of the girder stub portions thereby leaving a slight gap between the adjacent cut ends of each girder stub portion and the replacement girder portions. The sleeve inserts are preferably rotated or tilted outwardly to facilitate the fitting of the open cut ends of the replacement girder portion thereon. This outward tilting also ensures that the sleeve insert underlies the entire gap distance which is important in order to make a secure surrounding weld seam. Spot welds may be formed along the inner surface of each of the girder stub portion to serve as stops for the sleeve inserts to prevent them from being pushed too far into the girder stub portions when the replacement girder portion is installed.

The preferred width of each gap is approximately equal to the combined wall thickness of the replacement girder portion and the adjoining stub portions in order to receive a sufficiently thick and strong weld seam therewithin. In this way, a single weld seam can be made to join together each sleeve insert with its respective girder stub portion and cut end of the replacement girder portion. The weld seams can be made relatively simply and with great strength, because the sleeve inserts serve as supporting platforms which bridge the respective matching open cut ends of the girder stub portions and replacement girder portions. Further, a sufficiently strong and thick weld seam is made at each connection point by merely filling the respective gaps up to the level of the adjacent exterior surface contours of the respective girder stub portions and replacement girder portion. Thus, a smooth external surface contour can be obtained without considerable, expensive grinding, thereby avoiding abrasion and potentially weakening of the weld seam.

The length of the sleeve inserts is selected to be between approximately one third to one diameter of the associated girder stub portions or replacement girder portion. For the case where the girder is a bottom side sill, this corresponds no a sleeve insert length of approximately 50 to 60 mm. The preferred length of the sleeve inserts is important as they must be long enough to span each of the gaps with sufficient overlap at each end to adequately support the weld seams, yet not too long so as to prevent any outward tilting of the sleeve insert which may be needed to facilitate the installation of the replacement girder member. Also, fitting the open cut ends of the replacement girder portion onto outwardly tilted sleeve inserts ensures that each sleeve insert will completely span its respective gap upon final installation.

The conical opening of the free space region for the replacement girder member is obtained by severing the damaged girder portion with a pair of oblique parting cuts, preferably angled at 30 to 50 degrees from the longitudinal direction of the girder member. The oblique cuts on the girder member and the replacement girder member can be made simultaneously to ensure that the oblique cuts on the girder stub portion and on the replacement girder member will match. This can be accomplished by laying the replacement girder member next to the deformed girder member and then cutting both portions in one operation.

In an alternate embodiment, a conical opening of the free space may be formed by making the parting cut step-shaped or sawtooth-shaped.

Among the advantages of the present invention are that since the damaged portion of the girder member is cut out and replaced by a replacement girder member, restraightening or reshaping the damaged girder member is not required. The loss of strength associated with reshaping a deformed girder portion is thereby avoided.

Another advantage of the present invention is that the method can be carried out simply and reliably, and can be done without difficulty using conventional workshop tools.

Another advantage of the present invention is that the method and apparatus can be used to replace the relatively long side sills that are particularly at risk of damage during side collisions of the vehicle.

These and other objects and advantages of the present invention will become apparent to those skilled in the art from the following detailed description of the preferred embodiment, drawings and appended claims.

DRAWINGS

Exemplary embodiments, together with further details, features and advantages, are explained more fully with the aid of a drawing, in which:

FIG. 5 is an enlarged perspective view of a joint with a straight parting cut; and FIG. 6 is an enlarged perspective view of an alternate embodiment showing joint with a step-shaped parting cut.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Figure 1:
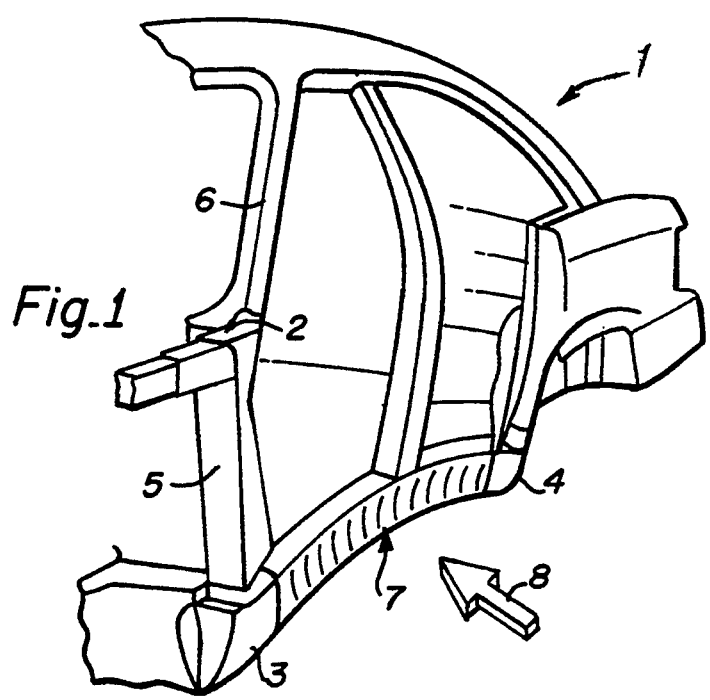
FIG. 1 is a partial perspective view of a vehicle body after a collision showing a deformed bottom side sill or girder member.

FIG. 1 is a partial perspective view of a vehicle after a collision. The vehicle body framework 1 is constructed of node elements 2, 3, 4 in the form of light-metal castings and girder members 5, 6 in the form of light-metal extruded sections. Another extruded hollow section girder member in the form of a deformed bottom side sill member 7 bridges the node elements 3 and 4. The sill or girder member 7 is shown as damaged or deformed, i.e. the girder member 7 has been bent inward as a result of a side collision. For purposes of definition, an arrow 8 represents the direction of the impact force towards the interior of the vehicle 1.

Figure 2:
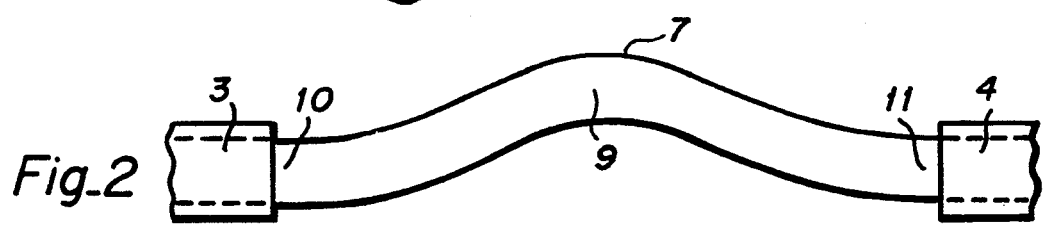
FIG. 2 is a plan view schematically illustrating the deformed girder assembly shown in FIG. 1.

FIG. 2 is a plan view schematically illustrating the deformed girder member 7. The deformed girder member 7 includes a deformed girder portion or region 9 disposed generally in the middle of the girder member 7 between undeformed portions 10 and 11. Although the deformed portion 9 is illustrated as bent-in towards the vehicle interior (i.e. along the direction of the arrow 8), it should be noted that the portion 9 could be deformed in another direction. The undeformed portions 10 and 11 are proximately disposed adjacent to the node elements 3 and 4, respectively.

Figure 3:
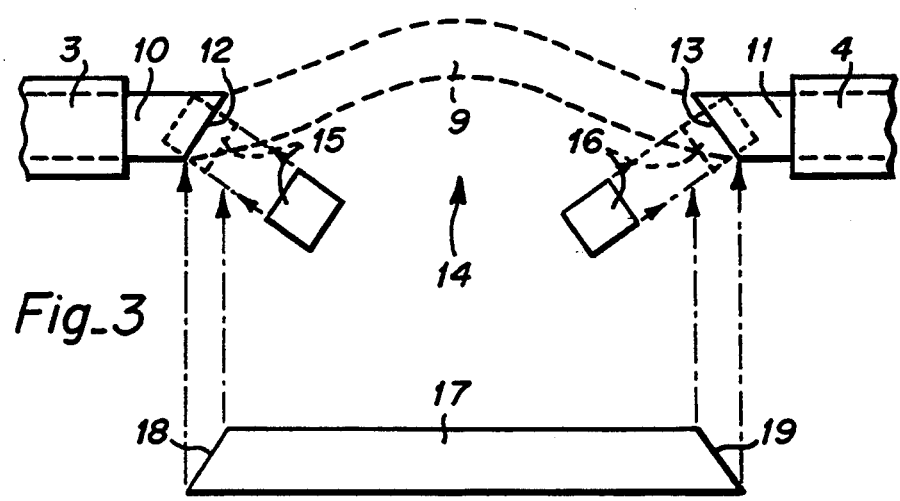
FIG. 3 is a view generally similar to FIG. 2, showing the girder assembly after a deformed portion has been severed and removed and also showing two sleeve inserts, and a replacement girder member exploded therefrom.
Figure 4:
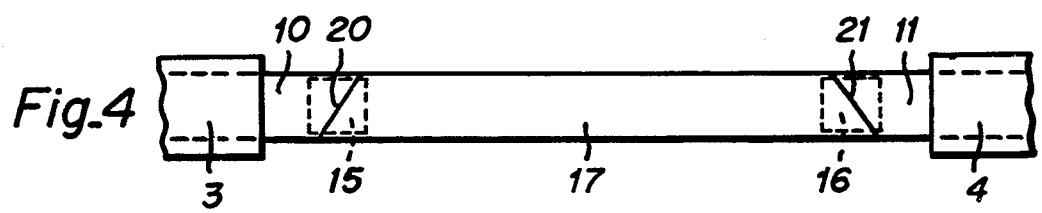
FIG. 4 is a view generally similar to FIGS. 2 and 3, in which the sleeve inserts and replacement girder member have been assembled and welded together.

Referring now to FIG. 3 and 4, the deformed girder portion 9 is severed and removed from the undeformed girder portions 10 and 11 along parting cuts 12 and 13, respectively. The remaining portions 10, 11 form girder stub portions which extend inwardly towards each other from the node elements 3, 4. The open ends of the girder stub portions 10, 11 defined a free space region 14 which is generally equal in volume and length to that of the removed (i.e. damaged) girder portion 9.

The parting cuts 12, 13 are preferably made at an oblique angle with respect to the longitudinal axis of the girder member 7. The value of the angle preferably is in the range of 30-50 degrees. The tapering angle of the parting cuts 12 and 13 is such that the free space region 14 expands in a generally open conical fashion towards the outside (i.e. opposite the direction of arrow 8) of the vehicle body.

Sleeve inserts 15 and 16, are fitted within the open cut ends of the girder stub portions 10 and 11, respectively. The outer diameter of the sleeve inserts 15 and 16 are sized sufficient to permit a friction fit within the open ends of the girder stub portions 10 and 11.

A replacement girder portion 17, having a longitudinal length generally equal to that of the free space region 14, is inserted between the open ends of the girder stub portions 10, 11 thereby bridging the free space region 14. The ends of the replacement girder portion 17 have parting cuts 18 and 19 which are angled complementary to the oblique cuts 12 and 13 of the girder stub portions 10 and 11, respectively. The oblique cuts 12, 13 on the girder member 7 and the cuts 18, 19 on the replacement girder portion 17 can be made simultaneously to ensure a matching fit. This can be accomplished by laying the replacement girder portion 17 next to the deformed girder member 7 and then cutting both portions in one operation.

The replacement girder portion 17 is inserted into the free space region 14 from the conically open side of the region 14 as shown by the direction arrows in FIG. 3.

For the purpose of installing the replacement girder portion 17, each of the sleeve inserts 15, 16 are first inserted part way into their corresponding open stub portions 10 and 11 and then tilted or rotated slightly outward as shown. Spot welds (not shown) may be applied to the inner surface walls of each of the girder stub portions 28, 29 to serve as stops for the sleeve inserts 15, 16, thereby preventing the sleeve inserts 15, 16 from being pushed too far into the girder stub portions 10, 11 when the replacement girder portion 17 is inserted.

The axial length of the sleeve inserts 15, 16 is preferably approximately one third to one diameter of the girder member 7. For a typical bottom side sill member of a vehicle body, this corresponds to a sleeve insert length of approximately 50 to 60 mm. The axial length of the sleeve inserts is important as the sleeve inserts 15, 16 must be sufficiently long to provide a base support for weld seams 20, 21 (to be discussed in greater detail below). However, the sleeve inserts 15, 16 can not be too long so as to limit outward tilting and hence interfere with the easy plug-in installation of the replacement girder portion 17. The longer the length of the sleeve inserts 15, 16, results in smaller outward tilt angles which means that it becomes difficult to position the replacement girder portion 17 onto the sleeve inserts 15, 16.

FIG. 4 is a plan view showing the replacement girder portion 17 installed and welded, along seams 20, 21, to the sleeve inserts 15, 16, and the open ends of the stub portions 10, 11. The length of the replacement girder portion 17 is selected such that a slight gap exists between each end of the replacement girder portion 17 and the corresponding open end of the stub portions 10 and 11. The width of these gaps is generally equal to at least the wall thickness of the material of the replacement girder portion and/or girder stub portion in order to receive sufficiently thick and strong weld seams 20, 21. Thus, the respective sleeve inserts 15 and 16 form internal sleeves that bridge the gaps underlying weld seams 20, 21 between the opposed ends of the replacement girder portion 17 and the girder stub portions 10, 11.

In view of the depth and width dimension of the gaps as above described, a suitably strong connection is made by simply filling in the gaps with the weld seams 20 and 21. As a result, a smooth external surface contour can be achieved, thereby requiring very little or no finishing work in order to prepare the bodywork for painting, and obviating regrinding of the weld seam and associated reduction in its strength.

Also, since the weld seams 20, 21 are located at a distance away from any previous welds, there is no reduction of strength due to repeated weldings in the same regions. Since only the deformed portion of the girder member 9 has been cut out, no reshaping of a light-metal girder portion, is required. Thus, the girder assembly has not been materially weakened due to any rebending or reshaping.

In FIG. 5 an enlarged illustration of the joint in the region of the girder stub portion 10 is shown. Here again the open outward parting cut 12, is shown with a correspondingly shaped parting cut 18 on the replacement girder portion 17.

A portion of the sleeve insert 15 has been inserted into the girder stub portion 10. The sleeve insert 15 is preferably tilted or rotated slightly in the outward direction (i.e. in the direction of an arrow 22) so as to facilitate the insertion of the replacement girder portion 17.

In an alternate embodiment the exposed portion of the sleeve insert 15 could be cut obliquely as indicated by the dashed line 23, in order to facilitate the fitted insertion of the replacement girder portion 17. The angle cut end 18 of the replacement girder portion 17 is then fitted onto the remaining exposed portion of the sleeve insert 15.

FIG. 6 is an enlarged perspective view of an alternate parting cut embodiment. The girder stub portion 10 is illustrated as an example. In this embodiment the generally conical shape opening, of the free space region 14 is formed by a step-shaped parting cut 24 on the girder stub portion 10 and a corresponding step-shaped parting cut 25 on a corresponding open end of the replacement girder portion 17 in this embodiment, it is necessary to tilt the sleeve insert 15 slightly outward, (i.e. in the direction of the arrow 22 and opposite the arrow 8) in order to easily insert the girder portion 17.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A method for repairing a damaged hollow section girder member disposed connected between two node elements in a vehicle bodywork which includes a supporting structure made up of hollow-section girder members joined together by node elements, comprising the steps of:
   a) cutting out a deformed portion of said damaged girder member at a distance from each of said node elements thereby leaving a girder stub portion attached to each of said node elements, each of said girder stub portions having a cut end which opens conically outward towards a side of the vehicle bodywork;
   b) inserting a sleeve insert within the open cut end of each of said girder stub portions such that:
      i) a first portion of each of said sleeve inserts is fully received within the open cut end of its respective girder stub portion; and
      ii) a second exposed portion of each of said sleeve inserts extends outwardly from its respective girder stub portion;
   c) installing a replacement girder portion onto the second exposed portion of each of said sleeve inserts, said replacement girder portion having opposed open ends which are cut to conform to the conically open cut ends of said girder stub portions, said replacement girder portion having an axial length less than the distance between said girder stub portions thereby having a gap between the respective open cut ends of said girder stub portions and said replacement girder portion; and
   d) welding a weld seam in each of said gaps to join each of said girder stub portions, to its respective sleeve insert and to said replacement girder portion.

2. A method for repairing a damaged hollow section girder member as in claim 1 wherein:
   a) said hollow section girder is a light-metal extruded section; and
   b) said node elements are light-metal castings.

3. A method for repairing a damaged hollow section girder member as in claim 2 wherein said hollow section girder is a side sill of the vehicle bodywork.

4. A method for repairing a damaged hollow section girder member as in claim 3 wherein said step of installing said replacement girder portion further comprises positioning said gap having a width approximately equal to the thickness of the material of said girder stub portions and said replacement girder portions.

5. A method for repairing a damaged hollow section girder member as in claim 4, wherein said step of inserting is carried out by said sleeve piece having an axial length greater than one third of an inner diameter of said girder stub portion and less than the inner diameter of said girder stub portion.

6. A method for repairing a damaged hollow section girder member as in claim 5 wherein said step of cutting out said deformed portion includes the step of making a parting cut along the cut ends of each of said girder stub portions and wherein said parting cut extends obliquely with respect to a longitudinal axis of said girder member at an angle within a range of angles greater than or equal to 30 degrees and less than or equal to 50 degrees.

7. A method for repairing a damaged hollow section guide member as in claim 5, wherein the step of cutting said deformed portion is accomplished such that said cut ends of each of said girder stub portions are formed as step-shaped cuts.

8. A method for repairing a damaged hollow section guide member as in claim 5, wherein the step of cutting said deformed portion is accomplished such that said cut ends of each of said girder stub portions are formed as step-shaped cuts.

9. A method for repairing a damaged hollow section girder member as in claim 1 wherein said hollow section girder is a side sill of the vehicle bodywork.

10. A method for repairing a damaged hollow section girder member as in claim 1 wherein said step of installing said replacement girder portion further comprises positioning said gap having a width approximately equal to the thickness of the material of said girder stub portions and said replacement girder portions.

11. A method for repairing a damaged hollow section girder member as in claim 1, wherein said step of inserting is carried out by said sleeve piece having an axial length greater than one third of an inner diameter of said girder stub portion and less than the inner diameter of said girder stub portion.

12. A method for repairing a damaged hollow section girder member as in claim 1 wherein said step of cutting out said deformed portion includes the step of making a parting cut along the cut ends of each of said girder stub portions and wherein said parting cut extends obliquely with respect to a longitudinal axis of said girder member at an angle within a range of angles greater than or equal to 30 degrees and less than or equal to 50 degrees.

13. A method for repairing a damaged hollow section girder member as in claim 1 which includes the step of rotating an exposed portion of the sleeve inserts outwardly of said cut ends to facilitate the installation of said replacement girder portion thereon.

* * * * *